United States Patent
Xu et al.

(10) Patent No.: US 11,284,389 B2
(45) Date of Patent: Mar. 22, 2022

(54) FRAME STRUCTURE CONFIGURATION METHOD, FRAME STRUCTURE OBTAINING METHOD, BASE STATION AND USER EQUIPMENT

(71) Applicants: China Mobile Communication Co., Ltd Research Institute, Beijing (CN); China Mobile Communications Group Co., Ltd., Beijing (CN)

(72) Inventors: Xiaodong Xu, Beijing (CN); Guangyi Liu, Beijing (CN); Yuhong Huang, Beijing (CN); Xueying Hou, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 111 days.

(21) Appl. No.: 16/765,986

(22) PCT Filed: Sep. 11, 2018

(86) PCT No.: PCT/CN2018/104989
§ 371 (c)(1),
(2) Date: May 21, 2020

(87) PCT Pub. No.: WO2019/100816
PCT Pub. Date: May 31, 2019

(65) Prior Publication Data
US 2020/0359376 A1     Nov. 12, 2020

(30) Foreign Application Priority Data
Nov. 22, 2017  (CN) .......................... 201711175871.7

(51) Int. Cl.
*H04W 72/04* (2009.01)

(52) U.S. Cl.
CPC ............................... *H04W 72/0446* (2013.01)

(58) Field of Classification Search
CPC ................................................ H04W 72/0446
See application file for complete search history.

(56) References Cited

U.S. PATENT DOCUMENTS

| 2016/0021655 A1 | 1/2016 | Seo et al. |
| 2016/0056947 A1 | 2/2016 | Tiirola et al. |

(Continued)

FOREIGN PATENT DOCUMENTS

| CN | 101651895 A | 2/2010 |
| CN | 101924727 A | 12/2010 |

(Continued)

OTHER PUBLICATIONS

R1-113756, 3GPP TSG RAN WG1, Meeting #67, San Francisco, USA, Nov. 14-18, 2011, Agenda Item 7.2.1.2, 6 pages.

(Continued)

*Primary Examiner* — Melvin C Marcelo
(74) *Attorney, Agent, or Firm* — Morgan, Lewis & Bockius LLP

(57) ABSTRACT

A frame structure configuration method, a frame structure obtaining method, a base station and UE are provided. The frame structure configuration method includes transmitting at least two cell-specific frame structure configurations concatenated in a time domain to the UE. Different periodicities of cell-specific uplink and/or downlink resources that are concatenated in a time domain are supported, and/or different configurations for the uplink and/or downlink resources within periodicities concatenated in the time domain are supported. In some embodiments, the base station transmits at least two cell-specific frame structure configurations concatenated in a time domain to the UE, where two periodicities of cell-specific uplink and/or down- (Continued)

transmitting at least two cell-specific frame structure configurations to UE, where different periodicities of cell-specific uplink and/or downlink resources that are concatenated in a time domain are supported, and/or different configurations for the uplink and/or downlink resources within periodicities concatenated in the time domain are supported / 11 link resources that are concatenated in a time domain have different durations, and/or, the uplink and/or downlink resources within the two periodicities concatenated in the time domain have different configurations.

20 Claims, 2 Drawing Sheets

(56) References Cited

U.S. PATENT DOCUMENTS

| | | |
|---|---|---|
| 2016/0197671 A1 | 7/2016 | Hwang et al. |
| 2017/0181165 A1 | 6/2017 | Au et al. |

FOREIGN PATENT DOCUMENTS

| | | | | |
|---|---|---|---|---|
| CN | 103312462 A | 9/2013 | | |
| WO | WO 2016/148530 A1 | 9/2016 | | |
| WO | WO-2020067989 A1 * | 4/2020 | ......... | H04L 25/0226 |

OTHER PUBLICATIONS

Extended European Search Report dated Jul. 27, 2021 for European Patent Application No. 18881356.2, pp. 8.
Examination Report dated Jul. 31, 2021 for India Patent Application No. 202027023601, pp. 5.
R1-162519, 3GPP TSG RAN WG1, Meeting #84bis, Busan Korea, Apr. 11-15, 2016, Agenda Item 8.1.5, 6 pages.
R3-174665, 3GPP TSG-RAN WG3 #98, Reno, USA, Nov. 27-Dec. 1, 2017, Agenda Item 10.14.2, 3 pages.
Chinese Office Action (First) dated Apr. 21, 2020, for Chinese Patent Application No. 201711175871.7, 6 pages.
English Translation of Chinese Office Action (First) dated Apr. 21, 2020, for Chinese Patent Application No. 201711175871.7, 15 pages.
Chinese Written Opinion of the International Searching Authority dated Nov. 29, 2018 for PCT/CN2018/104989, 9 pages.
International Preliminary Report on Patentability with Written Opinion (in English) dated Sep. 11, 2018 for PCT/CN2018/104989, 6 pages.

* cited by examiner transmitting at least two cell-specific frame structure configurations to UE, where different periodicities of cell-specific uplink and/or downlink resources that are concatenated in a time domain are supported, and/or different configurations for the uplink and/or downlink resources within periodicities concatenated in the time domain are supported ⟋ 11

Fig.1

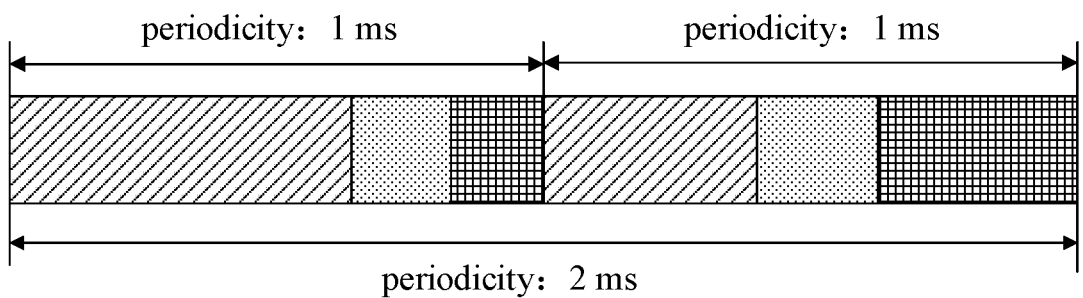

Figs.2

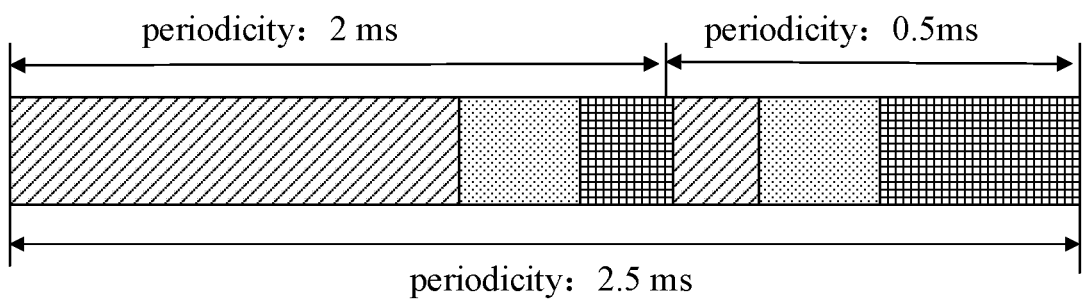

Figs.3

FRAME STRUCTURE CONFIGURATION METHOD, FRAME STRUCTURE OBTAINING METHOD, BASE STATION AND USER EQUIPMENT

CROSS-REFERENCE TO RELATED APPLICATION

This present application is a U.S. national phase application of a PCT Application No. PCT/CN2018/104989 filed on Sep. 11, 2018, which claims priority to a Chinese Patent Application No. 201711175871.7 filed in China on Nov. 22, 2017, a disclosure of which is incorporated in its entirety by reference herein.

TECHNICAL FIELD

The present disclosure relates to the field of communication technology, in particular to a frame structure configuration method, a frame structure obtaining method, a base station and user equipment (UE).

BACKGROUND

In a 5th-generation (5G) New Radio (NR) design, a semi-statically configured frame structure has been introduced. The frame structure includes a frame structure configuration with a relatively long periodicity and a frame structure configuration with a relatively short periodicity. The relatively short periodicity is, for example, 2 ms, 1 ms or 0.5 ms. The periodicities of 1 ms and 0.5 ms are suitable for a deployment scenario for a middle or high frequency hotspot, and the periodicity of 2 ms is suitable for a deployment scenario for a middle or low frequency macro network. The periodicities may be applied to services such as enhanced mobile broadband (eMBB) and ultra-reliable and low latency communications (URLLC). The uplink/downlink switching periodicity of 0.5 ms is an important enabling technology for achieving a 5G air-interface latency of 0.5 ms in a time division duplexing (TDD) system.

In the above configuration scheme, static resource configurations for all periodicities are identical, and a proportion of static uplink resources to static downlink resources in each periodicity is constant. In order to further improve the resource configuration flexibility, a joint periodicity configuration method may be adopted, so that different proportions of the static uplink resources to the static downlink resources may be employed in at least two consecutive periodicities arranged sequentially in time, thereby improving the resource configuration flexibility.

SUMMARY

An object of the present disclosure is to provide a frame structure configuration method, a frame structure obtaining method, a base station and UE, so as to solve the problem in the related art that identical static resources configuration in each periodicity leads to insufficient resource configuration flexibility.

In one aspect, the present disclosure provides in some embodiments a frame structure configuration method, including transmitting at least two cell-specific frame structure configurations to UE. Each cell-specific frame structure configuration includes a periodicity of cell-specific uplink and/or downlink resources and a configuration for the uplink and/or downlink resources within the periodicity. Different periodicities of cell-specific uplink and/or downlink resources that are concatenated in a time domain are supported, and/or different configurations for the uplink and/or downlink resources within periodicities concatenated in the time domain are supported.

In a possible embodiment of the present disclosure, the at least two cell-specific frame structure configurations are concatenated and repeated in the time domain to provide a configuration of a cell-specific target frame structure, and a periodicity of cell-specific uplink and/or downlink resources in the configuration of the cell-specific target frame structure is a sum of at least two periodicities of cell-specific uplink and/or downlink resources that are concatenated.

In a possible embodiment of the present disclosure, the periodicity of cell-specific uplink and/or downlink resources includes one of 0.5 ms, 1 ms, 2 ms, 5 ms and 10 ms.

In another aspect, the present disclosure provides in some embodiments a frame structure obtaining method, including: receiving at least two cell-specific frame structure configurations from a base station, where each cell-specific frame structure configuration includes a periodicity of cell-specific uplink and/or downlink resources and a configuration for the uplink and/or downlink resources within the periodicity, different periodicities of cell-specific uplink and/or downlink resources that are concatenated in a time domain are supported, and/or different configurations for the uplink and/or downlink resources within periodicities concatenated in the time domain are supported; and determining a configuration result of a cell-specific target frame structure in accordance with the at least two cell-specific frame structure configurations.

In a possible embodiment of the present disclosure, the determining the configuration result of the cell-specific target frame structure in accordance with the at least two cell-specific frame structure configurations includes: determining that the at least two cell-specific frame structure configurations are concatenated and repeated in the time domain to provide a configuration of the cell-specific target frame structure; determining a target periodicity of the cell-specific target frame structure in accordance with the configuration of the cell-specific target frame structure, where the target periodicity is a sum of at least two periodicities of cell-specific uplink and/or downlink resources that are concatenated; and determining a configuration for the uplink and/or downlink resources within the target periodicity in accordance with the configuration of the cell-specific target frame structure.

In a possible embodiment of the present disclosure, the periodicity of cell-specific uplink and/or downlink resources includes one of 0.5 ms, 1 ms, 2 ms, 5 ms and 10 ms.

In yet another aspect, the present disclosure provides in some embodiments a base station, including a processor and a transceiver. The transceiver is configured to transmit at least two cell-specific frame structure configurations to UE. Each cell-specific frame structure configuration includes a periodicity of cell-specific uplink and/or downlink resources and a configuration for the uplink and/or downlink resources within the periodicity. Different periodicities of cell-specific uplink and/or downlink resources that are concatenated in a time domain are supported, and/or different configurations for the uplink and/or downlink resources within periodicities concatenated in the time domain are supported.

In a possible embodiment of the present disclosure, the at least two cell-specific frame structure configurations are concatenated and repeated in the time domain to provide a configuration of a cell-specific target frame structure, and a periodicity of cell-specific uplink and/or downlink resources in the configuration of the cell-specific target frame structure is a sum of at least two periodicities of cell-specific uplink and/or downlink resources that are concatenated.

In a possible embodiment of the present disclosure, the periodicity of cell-specific uplink and/or downlink resources includes one of 0.5 ms, 1 ms, 2 ms, 5 ms and 10 ms.

In still yet another aspect, the present disclosure provides in some embodiments UE, including a processor and a transceiver. The transceiver is configured to receive at least two cell-specific frame structure configurations from a base station, each cell-specific frame structure configuration includes a periodicity of cell-specific uplink and/or downlink resources and a configuration for the uplink and/or downlink resources within the periodicity, different periodicities of cell-specific uplink and/or downlink resources that are concatenated in a time domain are supported, and/or different configurations for the uplink and/or downlink resources within periodicities concatenated in the time domain are supported. The processor is configured to determine a configuration result of a cell-specific target frame structure in accordance with the at least two cell-specific frame structure configurations.

In a possible embodiment of the present disclosure, the processor is further configured to: determine that the at least two cell-specific frame structure configurations are concatenated and repeated in the time domain to provide a configuration of the cell-specific target frame structure; determine a target periodicity of the cell-specific target frame structure in accordance with the configuration of the cell-specific target frame structure, where the target periodicity is a sum of at least two periodicities of cell-specific uplink and/or downlink resources that are concatenated; and determine a configuration for the uplink and/or downlink resources within the target periodicity in accordance with the configuration of the cell-specific target frame structure.

In a possible embodiment of the present disclosure, the periodicity of cell-specific uplink and/or downlink resources includes one of 0.5 ms, 1 ms, 2 ms, 5 ms and 10 ms.

In still yet another aspect, the present disclosure provides in some embodiments a communication device, including a storage, a processor, and a computer program stored in the storage and configured to be executed by the processor. The processor is configured to execute the computer program, to implement the above-mentioned frame structure configuration method, or to implement the above-mentioned frame structure obtaining method.

In still yet another aspect, the present disclosure provides in some embodiments a computer-readable storage medium storing therein a computer program. The computer program is configured to be executed by a processor, to implement steps of the above-mentioned frame structure configuration method, or to implement steps of the above-mentioned frame structure obtaining method.

The present disclosure at least has the following beneficial effects. According to the embodiments of the present disclosure, on the basis of a single-periodicity design, a dual-periodicity or multi-periodicity frame structure configuration method is provided, so as to transmit at least two cell-specific frame structure configurations concatenated in the time domain to UE. Different periodicities of cell-specific uplink and/or downlink resources that are concatenated in a time domain are supported, and/or different configurations for the uplink and/or downlink resources within periodicities concatenated in the time domain are supported. As a result, it is able to acquire various new periodicities through the combination of several typical periodicities, thereby improving the system scalability and the resource configuration flexibility.

BRIEF DESCRIPTION OF THE DRAWINGS

FIG. 1 is a flow chart of a frame structure configuration method according to some embodiments of the present disclosure;

FIG. 2 is a schematic view showing a frame structure configuration in the frame structure configuration method according to some embodiments of the present disclosure;

FIG. 3 is a schematic view showing another frame structure configuration in the frame structure configuration method according to some embodiments of the present disclosure;

DETAILED DESCRIPTION

Figure 4:
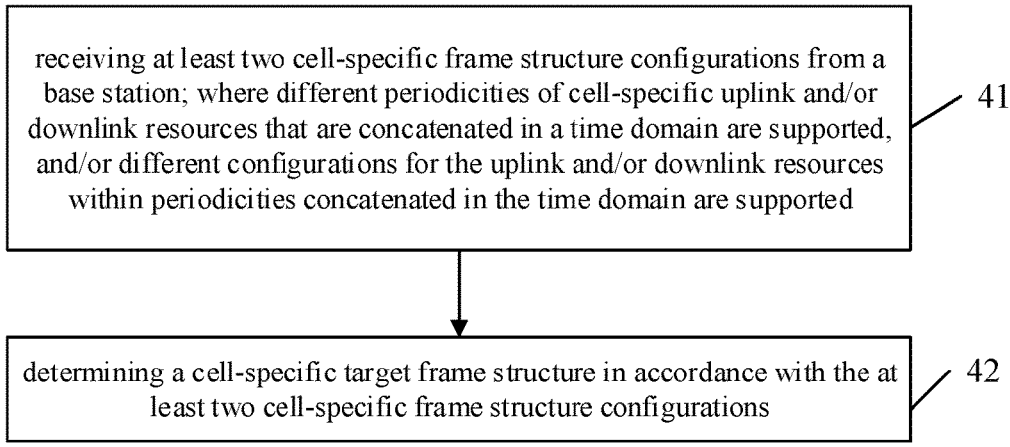
FIG. 4 is a flow chart of a frame structure obtaining method according to some embodiments of the present disclosure.

In order to make the objects, the technical solutions and the advantages of the present disclosure more apparent, the present disclosure will be described hereinafter in a clear and complete manner in conjunction with the drawings and embodiments.

As shown in FIG. 1, the present disclosure provides in some embodiments a frame structure configuration method, which includes a Step 11: transmitting at least two cell-specific frame structure configurations to UE. Each cell-specific frame structure configuration may include a periodicity of cell-specific uplink and/or downlink resources and a configuration for the uplink and/or downlink resources within the periodicity.

In this step, the cell-specific frame structure configuration belongs to a cell-specific configuration, i.e., it is a configuration indicated by system broadcast information and cannot be changed arbitrarily, so the cell-specific configuration may usually be considered as a static configuration. However, the cell-specific configuration may also be changed at a cell level in a system information change process, so the cell-specific configuration may also be considered as a semi-static configuration.

To be specific, the periodicity of uplink and/or downlink resources carried in the cell-specific frame structure configuration may be statically or semi-statically configured at a cell level. In addition, the configuration for the uplink and/or downlink resources carried in the cell-specific frame structure configuration may also be statically or semi-statically configured at a cell level.

Different periodicities of cell-specific uplink and/or downlink resources that are concatenated in a time domain are supported, and/or different configurations for the uplink and/or downlink resources within periodicities concatenated in the time domain are supported.

To be specific, in the embodiments of the present disclosure, when the durations of two periodicities of cell-specific uplink and/or downlink resources that are concatenated in the time domain are different from each other, the configurations for the uplink and/or downlink resources within the two periodicities concatenated in the time domain may be the same or different from each other.

Similarly, when the configurations for the uplink and/or downlink resources within the two periodicities concatenated in the time domain are different from each other, the durations of two periodicities of cell-specific uplink and/or downlink resources that are concatenated in the time domain may be the same or different from each other.

For example, FIG. 2 shows a combination of two frame structures concatenated in the time domain, in which durations of periodicities are the same and the configurations for the uplink and/or downlink resources are different. FIG. 3 shows a combination of two frame structures concatenated in the time domain, in which durations of periodicities are different and the configurations for the uplink and/or downlink resources are different too.

Optionally, the at least two cell-specific frame structure configurations are concatenated and repeated in the time domain to provide a configuration of a cell-specific target frame structure.

A periodicity of cell-specific uplink and/or downlink resources in the configuration of the cell-specific target frame structure is a sum of at least two periodicities of cell-specific uplink and/or downlink resources that are concatenated. As shown in FIG. 2, when the configuration of a cell-specific target frame structure is acquired by concatenating, in the time domain, cell-specific frame structure configurations of two frame structures concatenated in the time domain and each having a periodicity of 1 ms, a target frame has a periodicity of 2 ms (1 ms+1 ms). As shown in FIG. 3, when the configuration of a cell-specific target frame structure is acquired by concatenating, in the time domain, cell-specific frame structure configurations of two frame structures concatenated in the time domain and having periodicities of 2 ms and 0.5 ms respectively, a target frame has a periodicity of 2.5 ms (2 ms+0.5 ms).

For example, apart from a first cell-specific frame structure configuration broadcast in system information, at least another (i.e., a second) cell-specific frame structure configuration needs to be broadcast in system information. Periodicity in the second cell-specific frame structure configuration may be different from periodicity in the first cell-specific frame structure configuration, and/or the configuration for the uplink and/or downlink resources in the second cell-specific frame structure configuration may be different from the configuration for the uplink and/or downlink resources in the first cell-specific frame structure configuration.

The two identical or different periodicities are sequentially connected in the time domain so as to form a new periodicity, and this new periodicity may be continuously repeated in the time domain.

Optionally, the periodicity of the cell-specific uplink and/or downlink resources may include one of 0.5 ms, 1 ms, 2 ms, 5 ms and 10 ms.

To be specific, a periodicity of 2 ms may be acquired through the combination of two periodicities of 1 ms, a periodicity of 2.5 ms may be acquired through the combination of a periodicity of 2 ms and a periodicity of 0.5 ms, a periodicity of 3 ms may be acquired through the combination of a periodicity of 1 ms and a periodicity of 2 ms, a periodicity of 4 ms may be acquired through the combination of two periodicities of 2 ms, a periodicity of 20 ms may be acquired through the combination of two periodicities of 10 ms, and so on.

In summary, on the basis of a single-periodicity design, the dual-periodicity or multi-periodicity frame structure configuration method is provided in the embodiments of the present disclosure, so as to transmit at least two cell-specific frame structure configurations concatenated in the time domain to UE. Different periodicities of cell-specific uplink and/or downlink resources that are concatenated in a time domain are supported, and/or different configurations for the uplink and/or downlink resources within periodicities concatenated in the time domain are supported. As a result, it is able to acquire various new periodicities through the combination of several typical periodicities, thereby improving the system scalability and the resource configuration flexibility.

As shown in FIG. 4, the present disclosure further provides in some embodiments a frame structure obtaining method, which includes the following steps.

Step 41: receiving at least two cell-specific frame structure configurations from a base station. Each cell-specific frame structure configuration may include a periodicity of cell-specific uplink and/or downlink resources and a configuration for the uplink and/or downlink resources within the periodicity. Different periodicities of cell-specific uplink and/or downlink resources that are concatenated in a time domain are supported, and/or different configurations for the uplink and/or downlink resources within periodicities concatenated in the time domain are supported.

To be specific, in the embodiments of the present disclosure, when the durations of the two periodicities of cell-specific uplink and/or downlink resources that are concatenated in the time domain are different from each other, the configurations for the uplink and/or downlink resources within the two periodicities concatenated in the time domain may be the same or different from each other.

Similarly, when the configurations for the uplink and/or downlink resources within the two periodicities concatenated in the time domain are different, the durations of the two periodicities of cell-specific uplink and/or downlink resources that are concatenated in the time domain may be the same or different from each other.

Step 42: determining a configuration result of a cell-specific target frame structure in accordance with the at least two cell-specific frame structure configurations.

For example, FIG. 2 shows a combination of two frame structures concatenated in the time domain, in which durations of periodicities are the same and the configurations for the uplink and/or downlink resources are different. FIG. 3 shows a combination of two frame structures concatenated in the time domain, in which durations of periodicities are different and the configurations for the uplink and/or downlink resources are different too.

In a possible embodiment of the present disclosure, Step 42 may include: determining that the at least two cell-specific frame structure configurations are concatenated and repeated in the time domain to provide a configuration of the cell-specific target frame structure; determining a target periodicity of the cell-specific target frame structure in accordance with the configuration of the cell-specific target frame structure, where the target periodicity is a sum of at least two periodicities of cell-specific uplink and/or downlink resources that are concatenated; and determining a configuration for the uplink and/or downlink resources within the target periodicity in accordance with the configuration of the cell-specific target frame structure.

As shown in FIG. 2, when the configuration of a cell-specific target frame structure is acquired by concatenating, in the time domain, cell-specific frame structure configurations of two frame structures concatenated in the time domain and each having a periodicity of 1 ms, a target frame has a periodicity of 2 ms (1 ms+1 ms). As shown in FIG. 3, when the configuration of a cell-specific target frame structure is acquired by concatenating, in the time domain, cell-specific frame structure configurations of two frame structures concatenated in the time domain and having periodicities of 2 ms and 0.5 ms respectively, a target frame has a periodicity of 2.5 ms (2 ms+0.5 ms).

For example, apart from a first cell-specific frame structure configuration broadcast in system information, at least another (i.e., a second) cell-specific frame structure configuration needs to be broadcast in system information. Periodicity in the second cell-specific frame structure configuration may be different from periodicity in the first cell-specific frame structure configuration, and/or the configuration for the uplink and/or downlink resources in the second cell-specific frame structure configuration may be different from the configuration for the uplink and/or downlink resources in the first cell-specific frame structure configuration.

The two identical or different periodicities are sequentially connected in the time domain so as to form a new periodicity, and this new periodicity may be continuously repeated in the time domain.

In a possible embodiment of the present disclosure, the periodicity of the cell-specific uplink and/or downlink resources may include one of 0.5 ms, 1 ms, 2 ms, 5 ms and 10 ms.

To be specific, a periodicity of 2 ms may be acquired through the combination of two periodicities of 1 ms, a periodicity of 2.5 ms may be acquired through the combination of a periodicity of 2 ms and a periodicity of 0.5 ms, a periodicity of 3 ms may be acquired through the combination of a periodicity of 1 ms and a periodicity of 2 ms, a periodicity of 4 ms may be acquired through the combination of two periodicities of 2 ms, a periodicity of 20 ms may be acquired through the combination of two periodicities of 10 ms, and so on.

In summary, on the basis of a single-periodicity design, the dual-periodicity or multi-periodicity frame structure configuration method may be provided in the embodiments of the present disclosure, so as to transmit at least two cell-specific frame structure configurations concatenated in the time domain to UE. Different periodicities of cell-specific uplink and/or downlink resources that are concatenated in a time domain are supported, and/or different configurations for the uplink and/or downlink resources within periodicities concatenated in the time domain are supported. As a result, it is able to acquire various new periodicities through the combination of several typical periodicities, thereby improving the system scalability and the resource configuration flexibility.

Figure 5:
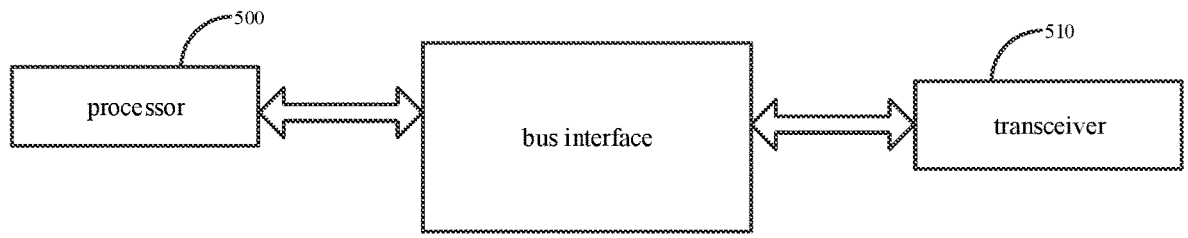
FIG. 5 is a schematic structural view showing a base station according to some embodiments of the present disclosure.

As shown in FIG. 5, the present disclosure further provides in some embodiments a base station, including a processor 500 and a transceiver 510. The transceiver 510 is configured to transmit at least two cell-specific frame structure configurations to UE. Each cell-specific frame structure configuration may include a periodicity of cell-specific uplink and/or downlink resources and a configuration for the uplink and/or downlink resources within the periodicity. Different periodicities of cell-specific uplink and/or downlink resources that are concatenated in a time domain are supported, and/or different configurations for the uplink and/or downlink resources within periodicities concatenated in the time domain are supported.

In the embodiments of the present disclosure, the at least two cell-specific frame structure configurations are concatenated and repeated in the time domain to provide a configuration of a cell-specific target frame structure.

A periodicity of cell-specific uplink and/or downlink resources in the configuration of the cell-specific target frame structure is a sum of at least two periodicities of cell-specific uplink and/or downlink resources that are concatenated.

In the embodiments of the present disclosure, the periodicity of the cell-specific uplink and/or downlink resources may include one of 0.5 ms, 1 ms, 2 ms, 5 ms and 10 ms.

In summary, on the basis of a single-periodicity design, the dual-periodicity or multi-periodicity frame structure configuration method may be provided in the embodiments of the present disclosure, so as to transmit at least two cell-specific frame structure configurations concatenated in the time domain to UE. Different periodicities of cell-specific uplink and/or downlink resources that are concatenated in a time domain are supported, and/or different configurations for the uplink and/or downlink resources within periodicities concatenated in the time domain are supported. As a result, it is able to acquire various new periodicities through the combination of several typical periodicities, thereby improving the system scalability and the resource configuration flexibility.

It should be appreciated that, the base station in the embodiments of the present disclosure is capable of implementing the above-mentioned frame structure configuration method, and all embodiments of the frame structure configuration method may be applied to the base station and achieve a same or similar beneficial effect.

Figure 6:
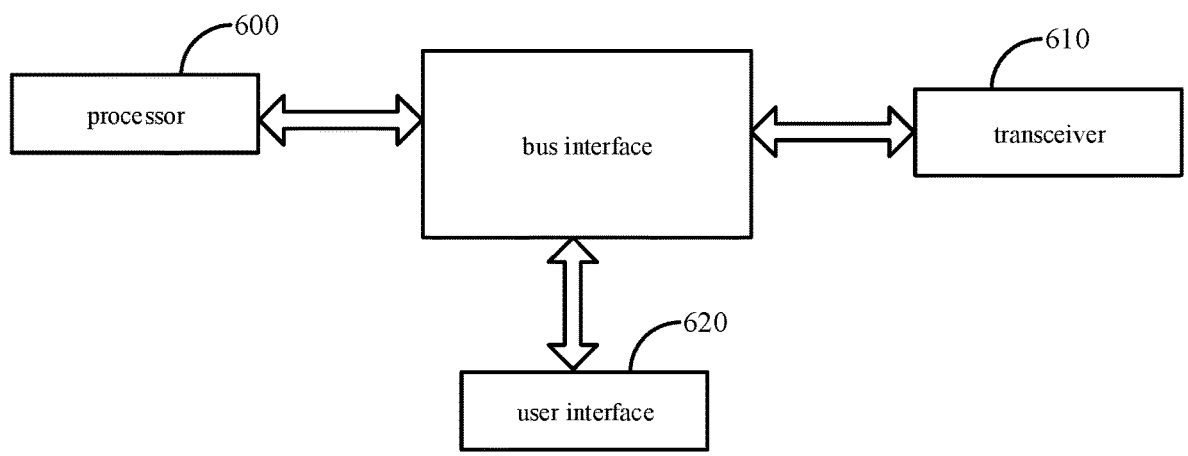
FIG. 6 is a schematic structural view showing UE according to some embodiments of the present disclosure.

As shown in FIG. 6, the present disclosure further provides in some embodiments UE, which includes a processor 600, a transceiver 610, and a user interface 620. The transceiver 610 is configured to receive at least two cell-specific frame structure configurations from a base station, each cell-specific frame structure configuration may include a periodicity of cell-specific uplink and/or downlink resources and a configuration for the uplink and/or downlink resources within the periodicity, different periodicities of cell-specific uplink and/or downlink resources that are concatenated in a time domain are supported, and/or different configurations for the uplink and/or downlink resources within periodicities concatenated in the time domain are supported. The processor 600 is configured to determine a configuration result of a cell-specific target frame structure in accordance with the at least two cell-specific frame structure configurations.

In the embodiments of the present disclosure, the processor 600 is further configured to: determine that the at least two cell-specific frame structure configurations are concatenated and repeated in the time domain to provide a configuration of the cell-specific target frame structure; determine a target periodicity of the cell-specific target frame structure in accordance with the configuration of the cell-specific target frame structure, where the target periodicity is a sum of at least two periodicities of cell-specific uplink and/or downlink resources that are concatenated; and determine a configuration for the uplink and/or downlink resources within the target periodicity in accordance with the configuration of the cell-specific target frame structure.

In the embodiments of the present disclosure, the periodicity of the cell-specific uplink and/or downlink resources may include one of 0.5 ms, 1 ms, 2 ms, 5 ms and 10 ms.

In a possible embodiment of the present disclosure, the periodicity of the cell-specific uplink and/or downlink resources may refer to the periodicity of the uplink and/or downlink resources that is statically configured at a cell level, and the configuration for the uplink and/or downlink resources within the periodicity may refer to the configuration for the uplink and/or downlink resources within the periodicity that is statically configured at a cell level.

In another possible embodiment of the present disclosure, the periodicity of the cell-specific uplink and/or downlink resources may refer to the periodicity of the uplink and/or downlink resources that is semi-statically configured at a cell level, and the configuration for the uplink and/or downlink resources within the periodicity may refer to a configuration for the uplink and/or downlink resources within the periodicity that is semi-statically configured at a cell level.

In summary, on the basis of a single-periodicity design, the dual-periodicity or multi-periodicity frame structure configuration method may be provided in the embodiments of the present disclosure, so as to transmit at least two cell-specific frame structure configurations concatenated in the time domain to UE. Different periodicities of cell-specific uplink and/or downlink resources that are concatenated in a time domain are supported, and/or different configurations for the uplink and/or downlink resources within periodicities concatenated in the time domain are supported. As a result, it is able to acquire various new periodicities through the combination of several typical periodicities, thereby improving the system scalability and the resource configuration flexibility.

It should be appreciated that, the UE in the embodiments of the present disclosure is capable of implementing the above-mentioned frame structure obtaining method, and all embodiments of the frame structure obtaining method may be applied to the base station and achieve a same or similar beneficial effect.

The present disclosure further provides in some embodiments a communication device, including a storage, a processor, and a computer program stored in the storage and configured to be executed by the processor. The processor is configured to execute the computer program, to implement various processes of the above-mentioned frame structure configuration method or the above-mentioned frame structure obtaining method and may achieve a same technical effect, which will thus not be particularly defined herein.

The present disclosure further provides in some embodiments a computer-readable storage medium storing therein a computer program. The computer program is configured to be executed by a processor, to implement various processes of the above-mentioned frame structure configuration method or the above-mentioned frame structure obtaining method and may achieve a same technical effect, which will thus not be particularly defined herein. The computer-readable storage medium may be a read-only memory (ROM), a random access memory (RAM), a magnetic disk, an optical disc or the like.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage media (including but not limited to disk storage, optical storage and the like) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a general computer, a dedicated computer, an embedded processor or any other programmable data processing devices to create a machine, so that instructions executable by the processor of the computer or the other programmable data processing devices may create a device to achieve the functions defined in one or more work flows in the flow chart and/or one or more blocks in the block diagram.

These computer program instructions may also be stored in a computer readable storage medium which may guide the computer or the other programmable data process devices to function in a certain way, so that the instructions stored in the computer readable storage medium may create a product including an instruction unit which achieves the functions defined in one or more flows in the flow chart and/or one or more blocks in the block diagram.

These computer program instructions may also be loaded onto the computer or the other programmable data process devices, so that a series of operation steps are executed on the computer or the other programmable devices to create processes achieved by the computer. Therefore, the instructions executed in the computer or the other programmable devices provide the steps for achieving the function defined in one or more flows in the flow chart and/or one or more blocks in the block diagram.

The above descriptions merely describe optional implementations of the present disclosure. It is appreciated, modifications and improvements may be made by a person of ordinary skill in the art without departing from the principle of the present disclosure, and these modifications and improvements shall also be construed as falling within the scope of the present disclosure.

What is claimed is:

1. A frame structure configuration method, comprising: transmitting at least two cell-specific frame structure configurations to user equipment (UE), wherein each cell-specific frame structure configuration comprises a periodicity of cell-specific uplink and/or downlink resources and a configuration for the uplink and/or downlink resources within the periodicity, wherein different periodicities of cell-specific uplink and/or downlink resources that are concatenated in a time domain are supported, and/or different configurations for the uplink and/or downlink resources within periodicities concatenated in the time domain are supported.

2. The frame structure configuration method according to claim 1, wherein the at least two cell-specific frame structure configurations are concatenated and repeated in the time domain to provide a configuration of a cell-specific target frame structure, wherein a periodicity of cell-specific uplink and/or downlink resources in the configuration of the cell-specific target frame structure is a sum of at least two periodicities of cell-specific uplink and/or downlink resources that are concatenated.

3. The frame structure configuration method according to claim 1, wherein the periodicity of cell-specific uplink and/or downlink resources comprises one of 0.5 ms, 1 ms, 2 ms, 5 ms and 10 ms.

4. A computer-readable storage medium storing therein a computer program, wherein the computer program is configured to be executed by a processor, to implement steps of the frame structure configuration method according to claim 1.

5. The frame structure configuration method according to claim 1, wherein at least two periodicities of cell-specific uplink and/or downlink resources are sequentially concatenated in the time domain, to form a first periodicity, and the first periodicity is continuously repeated in the time domain.

6. A base station, comprising a storage, a processor, and a computer program stored in the storage and configured to be executed by the processor, wherein the processor is configured to execute the computer program, to implement the frame structure configuration method according to claim 1.

7. The base station according to claim 6, wherein the at least two cell-specific frame structure configurations are concatenated and repeated in the time domain to provide a configuration of a cell-specific target frame structure, wherein a periodicity of cell-specific uplink and/or downlink resources in the configuration of the cell-specific target frame structure is a sum of at least two periodicities of cell-specific uplink and/or downlink resources that are concatenated.

8. The base station according to claim 6, wherein the periodicity of cell-specific uplink and/or downlink resources comprises one of 0.5 ms, 1 ms, 2 ms, 5 ms and 10 ms.

9. The base station according to claim 6, wherein at least two periodicities of cell-specific uplink and/or downlink resources are sequentially concatenated in the time domain, to form a first periodicity, and the first periodicity is continuously repeated in the time domain.

10. The computer-readable storage medium according to claim 4, wherein, at least two periodicities of cell-specific uplink and/or downlink resources are sequentially concatenated in the time domain, to form a first periodicity, and the first periodicity is continuously repeated in the time domain.

11. A frame structure obtaining method, comprising:
receiving at least two cell-specific frame structure configurations from a base station, wherein each cell-specific frame structure configuration comprises a periodicity of cell-specific uplink and/or downlink resources and a configuration for the uplink and/or downlink resources within the periodicity, different periodicities of cell-specific uplink and/or downlink resources that are concatenated in a time domain are supported, and/or different configurations for the uplink and/or downlink resources within periodicities concatenated in the time domain are supported; and
determining a configuration result of a cell-specific target frame structure in accordance with the at least two cell-specific frame structure configurations.

12. The frame structure obtaining method according to claim 11, wherein the determining the configuration result of the cell-specific target frame structure in accordance with the at least two cell-specific frame structure configurations comprises:
determining that the at least two cell-specific frame structure configurations are concatenated and repeated in the time domain to provide a configuration of the cell-specific target frame structure;
determining a target periodicity of the cell-specific target frame structure in accordance with the configuration of the cell-specific target frame structure, wherein the target periodicity is a sum of at least two periodicities of cell-specific uplink and/or downlink resources that are concatenated; and
determining a configuration for the uplink and/or downlink resources within the target periodicity in accordance with the configuration of the cell-specific target frame structure.

13. The frame structure obtaining method according to claim 11, wherein the periodicity of cell-specific uplink and/or downlink resources comprises one of 0.5 ms, 1 ms, 2 ms, 5 ms and 10 ms.

14. The frame structure obtaining method according to claim 11, wherein at least two periodicities of cell-specific uplink and/or downlink resources are sequentially concatenated in the time domain, to form a first periodicity, and the first periodicity is continuously repeated in the time domain.

15. User equipment (UE), comprising a storage, a processor, and a computer program stored in the storage and configured to be executed by the processor, wherein the processor is configured to execute the computer program, to implement the frame structure obtaining method according to claim 11.

16. The UE according to claim 15, wherein the processor is further configured to execute the computer program to implement following steps:
determining that the at least two cell-specific frame structure configurations are concatenated and repeated in the time domain to provide a configuration of the cell-specific target frame structure;
determining a target periodicity of the cell-specific target frame structure in accordance with the configuration of the cell-specific target frame structure, wherein the target periodicity is a sum of at least two periodicities of cell-specific uplink and/or downlink resources that are concatenated; and
determining a configuration for the uplink and/or downlink resources within the target periodicity in accordance with the configuration of the cell-specific target frame structure.

17. The UE according to claim 15, wherein the periodicity of cell-specific uplink and/or downlink resources comprises one of 0.5 ms, 1 ms, 2 ms, 5 ms and 10 ms.

18. The UE according to claim 15, wherein at least two periodicities of cell-specific uplink and/or downlink resources are sequentially concatenated in the time domain, to form a first periodicity, and the first periodicity is continuously repeated in the time domain.

19. A computer-readable storage medium storing therein a computer program, wherein the computer program is configured to be executed by a processor, to implement steps of the frame structure obtaining method according to claim 11.

20. The computer-readable storage medium according to claim 19, wherein, at least two periodicities of cell-specific uplink and/or downlink resources are sequentially concatenated in the time domain, to form a first periodicity, and the first periodicity is continuously repeated in the time domain.

* * * * *